Sept. 9, 1958 G. E. GRAVENSTINE 2,851,137
SHAFT LOCKING MECHANISM
Filed July 22, 1954
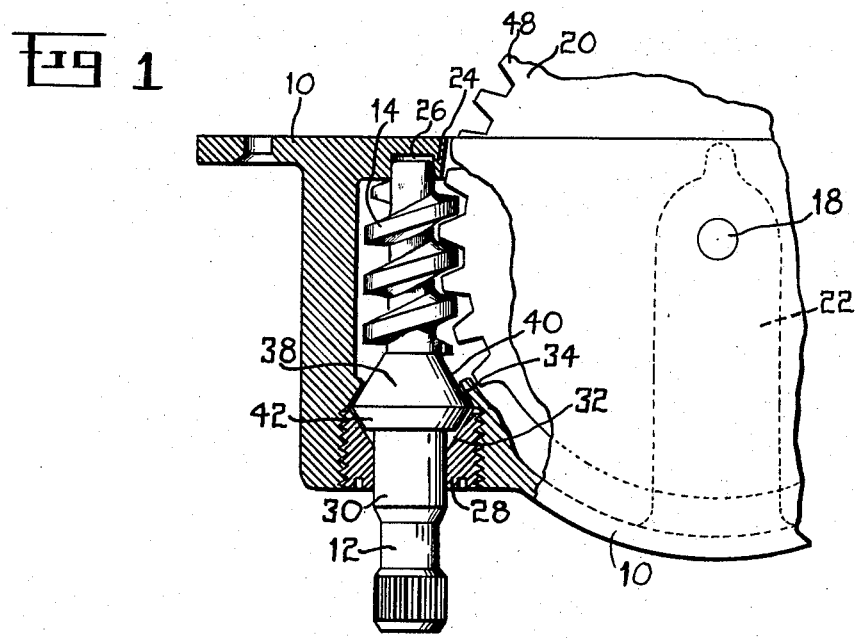
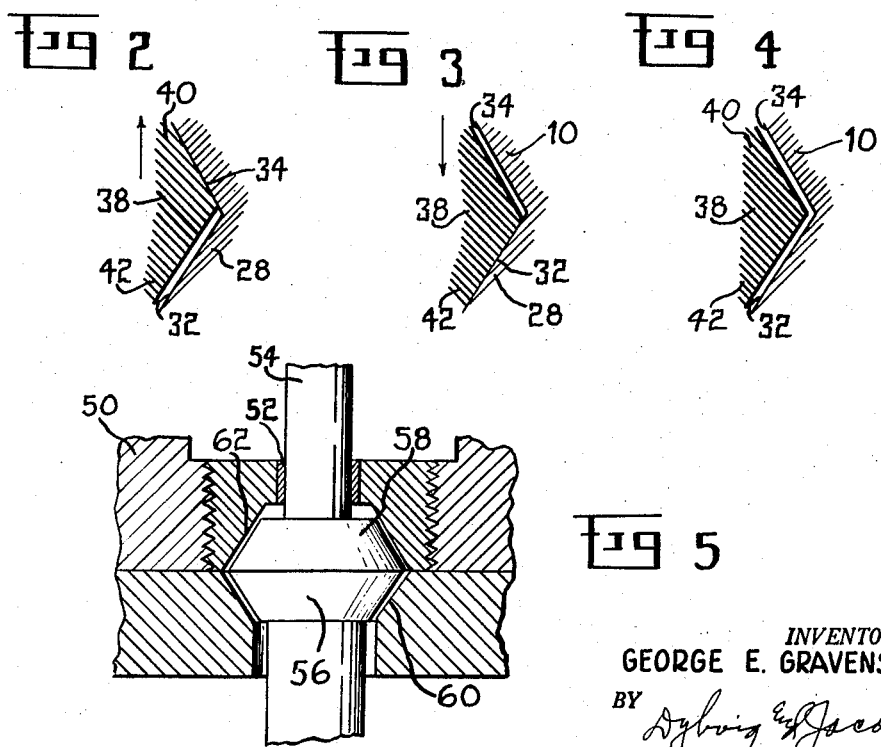
INVENTOR.
GEORGE E. GRAVENSTINE
BY
HIS ATTORNEYS

United States Patent Office

2,851,137
Patented Sept. 9, 1958

2,851,137

SHAFT LOCKING MECHANISM

George E. Gravenstine, Dayton, Ohio, assignor, by mesne assignments, to The Yale and Towne Manufacturing Company, New York, N. Y., a corporation of Connecticut Application July 22, 1954, Serial No. 444,972

5 Claims. (Cl. 192—8)

This invention relates to a shaft locking mechanism which can lock a shaft or permit a shaft to rotate freely. The invention also relates to a worm gear or helical gear mechanism in which a helical gear is a driver element only and may not be rotatively driven by another gear element which is in meshed relation therewith.

The fact is known in the art of helical gears that in a conventional gear mechanism in which the helical gear has a helix angle greater than approximately five degrees the helical gear may be driven member as well as a driving member.

In many applications it is desirable to have a worm gear mechanism in which the worm gear has a comparatively large helix angle and in which the worm gear may be a driver member but may not be rotatively driven by any other gear in meshed relation therewith. For example, an application in which a worm gear mechanism is frequently employed is that of a ventilator actuator mechanism. Such a mechanism employs a rotatably mounted helical gear which is adapted to drive a gear wheel or gear segment. An elongate arm or other type of lever member joins the gear segment to the ventilator. In such a ventilator actuator mechanism it is desirable to provide means by which the worm gear may easily operate the ventilator. However, the pressure of wind and other forces should not be able to move the ventilator. In other words, the worm gear member should be a non-drivable member with respect to the gear sector. The ventilator should remain in any adjusted position.

Hence, an object of this invention is to provide a helical gear mechanism in which the helical gear or worm gear element may be a driver element and may not be a driven element.

Another object of this invention is to provide a shaft locking mechanism in which a shaft may be rotated easily and freely if no appreciable axial force is exerted upon the shaft, but in which the shaft becomes locked against rotation if an axial force is exerted upon the shaft.

Other objects and advantages reside in the construction of parts, the combination thereof and the mode of operation, as will become more apparent from the following description.

In the drawing;

Figure 1 is a top plan view with parts broken away showing the shaft locking mechanism of this invention in combination with a worm gear unit.

Figure 2 is a diagrammatic view illustrating the manner in which the shaft locking means of this invention operates if the shaft is moved longitudinally in one given direction.

Figure 3 is a diagrammatic view similar to that of Figure 2 illustrating the manner in which the shaft locking means operates when the shaft is moved longitudinally in the opposite direction.

Figure 4 is a diagrammatic view similar to that of Figures 2 and 3 illustrating the manner in which a shaft provided with a locking means of this invention becomes a free operating member during normal driving operation of the shaft member.

Figure 5 is a sectional view disclosing the shaft locking means of this invention.

Referring to the drawing in detail, a worm gear mechanism of this invention comprises a support housing 10 in which is rotatably mounted a shaft member 12. Integral with the shaft member 12 is a helical gear or worm gear 14. Rotatably mounted upon a pintle 18, normal to the shaft 12, is a gear wheel or gear sector 20.

The pintle 18 is carried by a bracket member 22 which is attached to the support housing 10. The shaft 12 is rotatably carried by the support housing 10 in any suitable bearing means which provides a slight amount of longitudinal movement of the shaft 12. As shown in Figure 1, a bearing member 24 carries one end of the shaft 12, permitting slight axial movement of the shaft 12 within the bearing member 24 as indicated by an opening 26 between the end of the shaft 12 and the end wall member of the bearing 24.

The other end of the shaft 12 is provided with a journal surface 30 which is rotatably carried by a bearing member 28 which has an annular cylindrical bore concentric with the shaft 12. The internal end wall of the bearing member 28 is provided with an annular diverging or tapered surface 32 concentric with the shaft 12. Within the support housing 10 immediately adjacent the diverging surface 32 of the bearing 28 is an inwardly tapered annular surface 34. The tapered annular surface 34 may be a part of the internal wall surface of the support housing 10.

Integrally formed upon the shaft 12 is a double frustum conical collar 38 in which a frustum conical member 40 joins a frustum conical member 42. The frustum conical members 40 and 42 are concentric with the shaft 12 and the ends of the frustum conical members 40 and 42 having the greatest diameter are positioned one adjacent the other as clearly shown in Figure 1.

The double frustum conical collar 38 is freely disposed within the housing 10. The frustum conical members 40 and 42 have lesser diameters than diverging surfaces 34 and 32. The frustum conical members 40 and 42 are complementary to the surfaces 34 and 32 respectively.

The frustum conical member 42 does not engage the diverging surface 32 of the bearing member 28 unless there is axial movement of the shaft 12 outwardly with respect to the housing member 10. Likewise, there is no engagement between the frustum conical member 40 and the inwardly diverging surface 34 within the housing 10 unless there is inward longitudinal movement of the shaft 12 within the housing 10.

The helical gear 14 engages teeth 48 of the gear wheel 20 and the gear wheel 20 is readily rotated as the helical gear 14 is rotated. Regardless of the direction of rotation of the helical gear member 14, the gear wheel 20 may be freely rotated by the helical gear member 14. Naturally, the direction of rotation of the gear wheel 20 reverses with reversal of direction of rotation of the helical gear 14.

The helix angle of the worm gear or helical gear 14 is sufficiently great that the worm gear 14 may be driven by the gear wheel 20 if no means are provided for locking the shaft 12 from being driven by the gear wheel 20.

With respect to this invention, when the shaft 12 moves longitudinally, the surface 34 or 32 is engaged by one of the frustum conical members 40 or 42, depending upon the direction of longitudinal movement of the shaft 12. Looking at Figure 1, if an attempt is made to use the gear wheel 20 as a driving member in a clockwise direction, the teeth 48 of the gear wheel 20 apply pressure against the helical gear 14 forcing the shaft 12 in a direction inwardly within the housing 10. Thus, the frustum conical member 40 engages the tapered surface 34. When the frustum conical member 40 engages the annular tapered surface 34, a locking action occurs. The force exerted by the teeth 48 of the gear wheel 20 against the helical gear 14 urges the shaft 12 inwardly and this force is sufficient to cause locking engagement between the annular tapered surface 34 and the frustum conical member 40.

Likewise, if an attempt is made to rotate the gear wheel 20 in a counterclockwise direction, the teeth 48 of the gear wheel 20 apply pressure against the helical gear 14 causing a longitudinal movement of the shaft 12 in a direction outwardly from within the support housing 10. The outward longitudinal movement of the shaft 12 results in contact between the frustum conical member 42 and the tapered surface 32. Thus, locking action results.

The operation of the locking action is illustrated diagrammatically in Figures 2 and 3. In Figure 2 is shown engagement of the frustum conical member 40 with the tapered surface 34. The frustum conical member 40 of the double frustum conical collar 38 is shown engaging the tapered surface 34 as a result of the longitudinal movement of the shaft 12 which is actuated by attempted rotation of the gear wheel 20 in a clockwise direction.

In Figure 3 is shown engagement of the frustum conical member 42 with the tapered surface 32 of the bearing 28. Thus, the shaft 12 is locked against rotation actuated by the gear wheel 20.

In Figure 4 is shown the position of the double frustum conical collar 38 showing clearance between the frustum conical members 40 and 42 and the tapered surfaces 34 and 32. This is the normal position of the double frustum conical collar 38 with respect to the tapered surfaces 34 and 32 when no axial force is exerted upon the shaft 12.

It has been found that no locking action occurs when the shaft 12 acts as a driving member and the gear wheel 20 is the driven member.

In Figure 5 is shown a shaft locking mechanism made according to this invention. The locking mechanism comprises a support housing 50 provided with a bearing 52 within which is supported a shaft 54. Integrally mounted upon the shaft 54 is a frustum conical member 56 and a frustum conical member 58. These frustum conical members 56 and 58 are disposed together concentrically upon the shaft 54 with the greatest diameters of the conical members 56 and 58 abutting each other. The shaft 54 is so mounted that it may move longitudinally within the bearing 52 so that the frustum conical member 56 may engage an annular tapered surface 60 within the housing 50 if the shaft 54 moves in one longitudinal direction, and the frustum conical member 58 may engage an annular tapered surface 62 if the shaft moves in the opposite longitudinal direction. If the shaft 54 is forced to move in either axial direction, a locking action occurs as a result of the engagement of one of the frustum conical members 56 or 58 with its complementary annular tapered surface 60 or 62. Thus, a mechanism is provided by which any shaft, such as the shaft 54, may be freely rotated if no axial force is exerted upon the shaft. However, if an axial force is exerted upon the shaft, a locking action occurs and the shaft is locked against rotation.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a ventilator actuator gear mechanism, a support structure, a worm gear provided with a shaft member rotatably carried by the support structure, the support structure being provided with means for permitting slight longitudinal movement of the shaft with respect to the support structure, a gear wheel rotatably supported in meshed relation with the worm gear, and annular collar provided with a pair of joined tapered diverging journal surfaces attached to the shaft member and concentric therewith, a sleeve having a pair of connected tapered inner surfaces and carried by the support structure, the sleeve loosely surrounding the collar and having the inner surfaces thereof complementary to the tapered journal surfaces of the collar, thus permitting axial movement of the shaft but permitting engagement of the collar with only one inner surface of the sleeve at any given time.

2. In a ventilator actuator mechanism of the type provided with a shaft, a helical gear on said shaft and concentric therewith, a structure rotatably supporting the shaft, the structure permitting slight axial movement of the shaft, a toothed gear in mesh with the helical gear, the combination comprising a double frustum conical collar on said shaft, a housing attached to the support structure, the housing being provided with a cavity having annular tapered internal walls complementary to the double frustum conical collar, the largest diameter of the collar being less than the largest diameter of the internal cavity so that the shaft is free to move axially before engagement occurs between the tapered collar and an internal wall of the cavity, engagement of the collar with a wall of the housing causing a locking effect between the housing and the shaft.

3. In a worm gear ventilator actuator assembly of the type having a support structure, a shaft rotatably carried by the support structure, a worm carried by the shaft, a gear rotatably mounted upon an axis normal to the shaft, the gear being in meshed relation with the worm, the combination comprising a bearing provided with a bore having a pair of annular diverging wall surfaces forming a vertex therebetween, a double frustum conical collar attached to the shaft and positioned within the bore of the bearing, the collar having joined diverging surfaces substantially parallel to the wall surfaces of the bore of the bearing, the double frustum conical collar thus having a vertex at the juncture of the diverging surfaces, the greatest diameter of the collar being slightly less than the greatest diameter of the bore, the diverging surfaces of the collar thus being spaced from the pair of wall surfaces of the bore when the vertex of the collar is aligned with the vertex of the wall surfaces, thus axial movement of the collar between the wall surfaces is permitted and the collar engages only one of the wall surfaces of the bore at any given time.

4. A shaft locking mechanism for an actuator, a housing provided with a cavity therein, the cavity being provided with a pair of diverging radial tapered internal bearing surfaces held in fixed positions, a worm gear having a rotatably mounted shaft carried by the housing, the shaft being provided with a pair of diverging conical thrust journal portions, the thrust journal portions being positioned within the cavity, the cavity being slightly larger than the conical thrust journal portions to provide clearance between the conical journal portions and the internal bearing surfaces, thus permitting axial movement of the shaft as the journal portions move within the cavity between the tapered walls thereof, each of the journal portions being engageable with one of the bearing surfaces for limiting the axial movement of the shaft in either axial direction, engagement of a journal portion with a bearing wall surface causing locking effects of the shaft against rotation thereof, and a gear wheel rotatably supported in meshed relation with the worm gear and rotatable therewith.

5. In a ventilator actuator shaft locking mechanism, a housing provided with a cavity therein, the cavity having a pair of annular tapered diverging wall surfaces, a rotatably mounted axially movable shaft extending through the cavity and concentric with the annular tapered wall surfaces, the shaft being axially movable with respect to both of the wall surfaces, and a pair of diverging frustum conical members attached to the shaft and positioned within the cavity of the housing, the angles of taper of the frustum conical members being substantially equal and complementary to the angles of taper of the tapered wall surfaces of the cavity, the cavity being slightly larger than the conical members to provide clearance between the conical members and the wall surfaces, the largest diameter of the wall surfaces being larger than the largest diameter of the frustum conical members, thus permitting axial movement of the shaft with the conical members, thus permitting engagement of only one frustum conical member with a wall surface of the cavity at any given time, such engagement causing a locking effect between the shaft and the housing.

References Cited in the file of this patent

UNITED STATES PATENTS

| | | |
|---|---|---|
| 445,144 | Hunter | Jan. 20, 1891 |
| 2,307,175 | Wainwright | Jan. 5, 1943 |
| 2,686,669 | Johnson | Aug. 17, 1954 |